Aug. 22, 1950 L. G. SAGEN 2,520,067
APPARATUS FOR BARBECUING CHICKEN AND OTHER FOWL
Filed Jan. 14, 1948 3 Sheets-Sheet 1
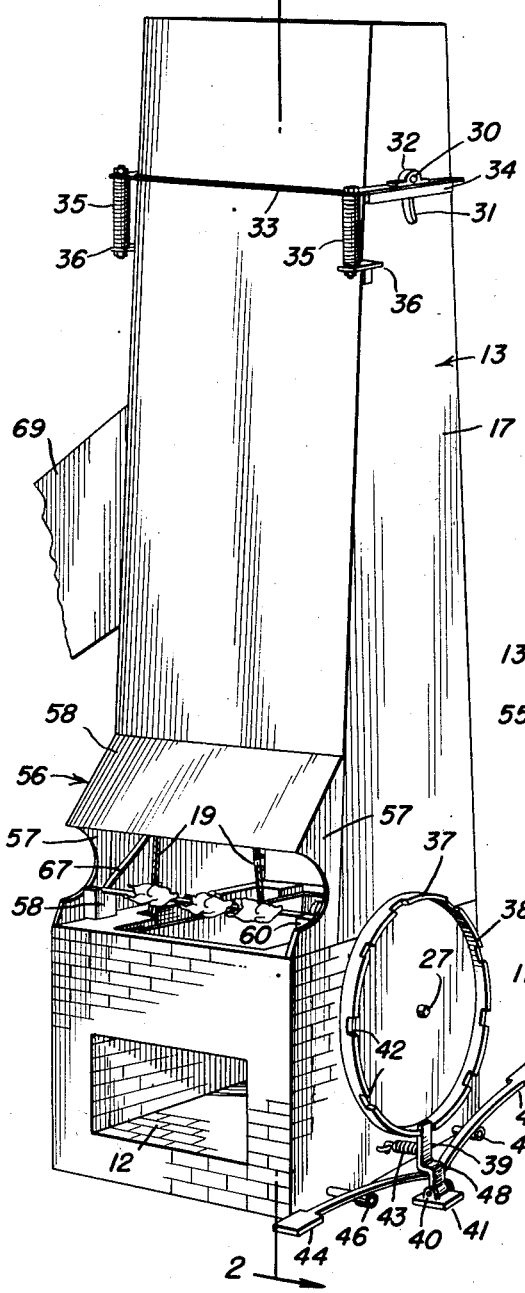
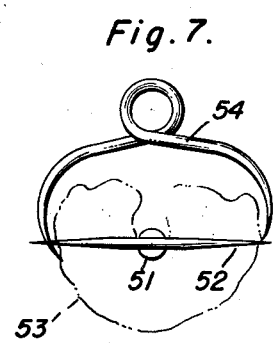
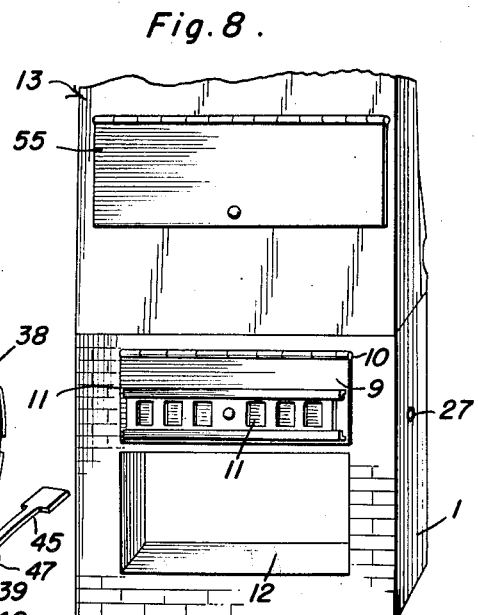
Lawrence G. Sagen
INVENTOR.

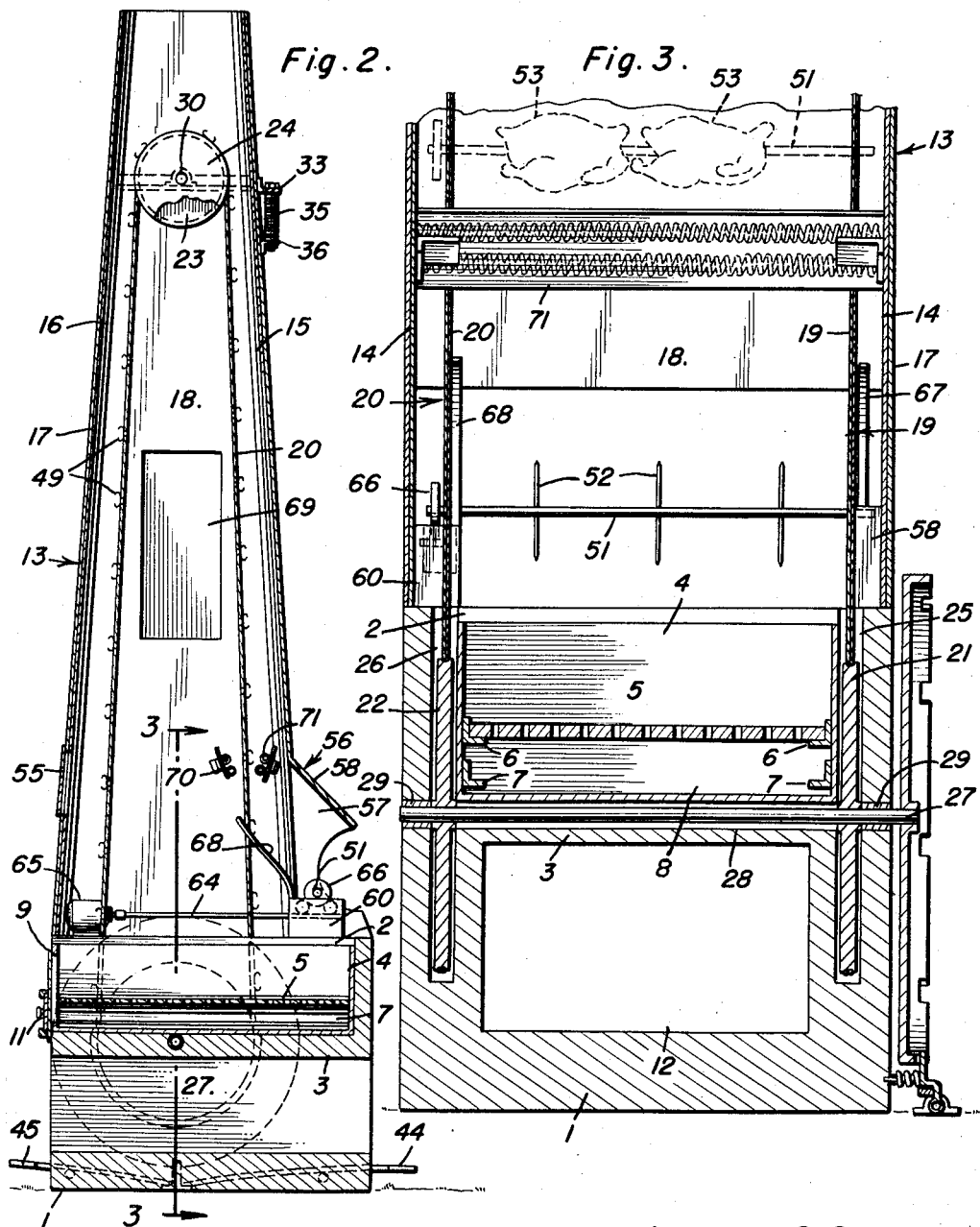

Aug. 22, 1950 — L. G. SAGEN — 2,520,067
APPARATUS FOR BARBECUING CHICKEN AND OTHER FOWL
Filed Jan. 14, 1948 — 3 Sheets-Sheet 3
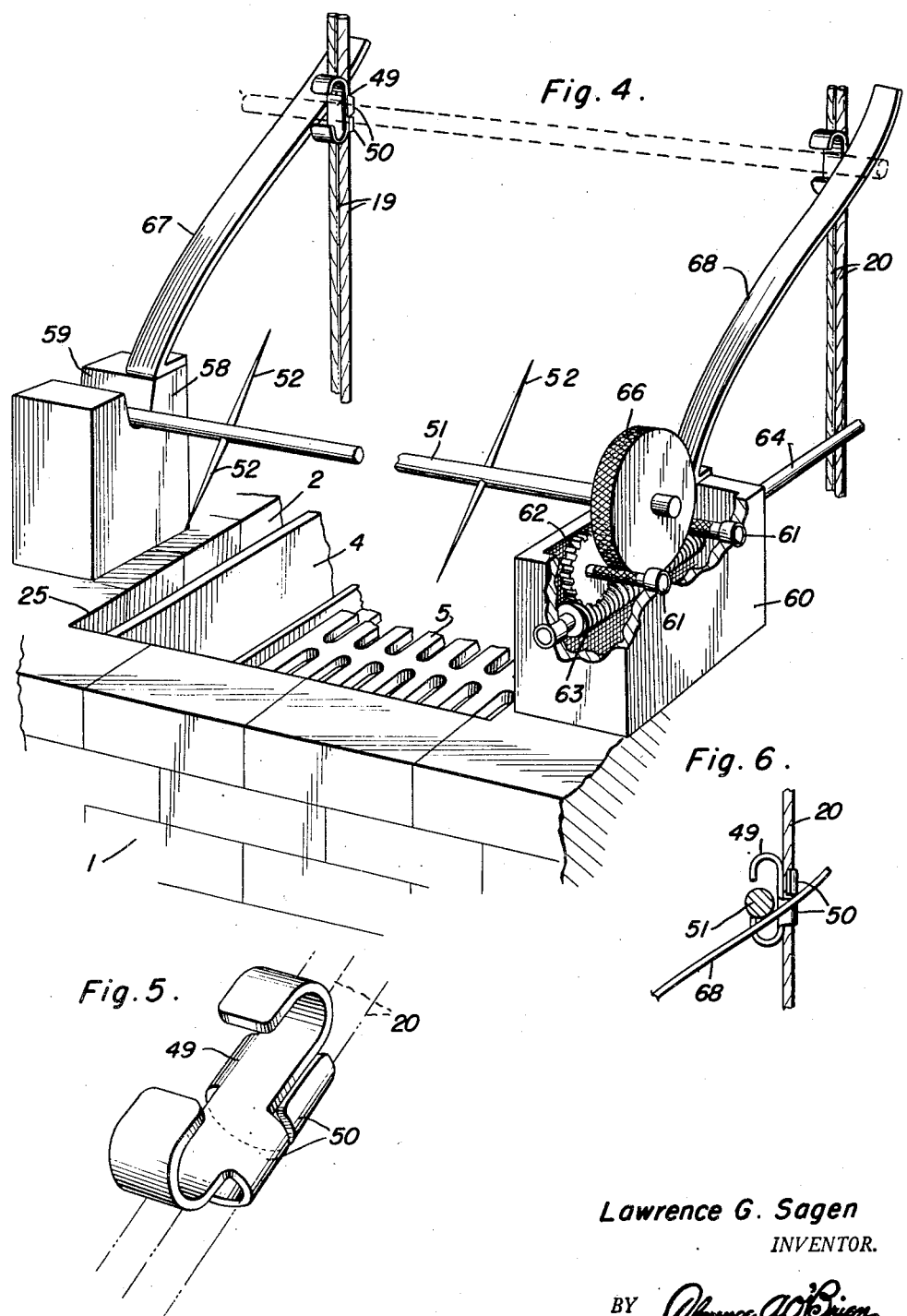
Lawrence G. Sagen
INVENTOR.

Patented Aug. 22, 1950

2,520,067

UNITED STATES PATENT OFFICE 2,520,067

APPARATUS FOR BARBECUING CHICKEN AND OTHER FOWL

Lawrence G. Sagen, Auburn, N. Y., assignor of one-half to William T. Sorensen, Salt Lake City, Utah, and one-half to Alvin O. Sagen, Pensacola, Fla.

Application January 14, 1948, Serial No. 2,276

10 Claims. (Cl. 99—420)

My invention relates to improvements in apparatus for barbecuing chicken, and other fowl, especially, although not necessarily.

The primary object of my invention is to provide for quickly barbecuing whole chicken, or other fowl, in quick succession over an open fire and smoking the same, if desired, to impart additional flavor thereto.

Another object is to provide apparatus for accomplishing the above adapted to be loaded with a large number of chickens, or other fowl, and for pre-cooking the same slowly, with or without being smoked, as desired, and then quickly finally broiling the same on display and in succession over an open hot fire.

Still another object is to provide apparatus for the above purposes, which is simple in construction, will not get out of order from prolonged use, and is inexpensive to install, operate, and manufacture.

Other and subordinate objects, within the purview of my invention, together with the precise nature of my improvements will be readily understood when the succeeding description and claims are read with reference to the drawings accompanying and forming part of this specification.

In said drawings:

Figure 1 is a view in perspective of my improved apparatus in a preferred embodiment thereof;

Figure 2 is a view in vertical section taken substantially on the line 2—2 of Figure 1;

Figure 3 is a fragmentary view in vertical section taken on the line 3—3 of Figure 2 and drawn to a larger scale;

Figure 4 is a fragmentary detailed view in perspective, partly in section, drawn to a still larger scale;

Figure 5 is a view in perspective of one of the spit rod holders;

Figure 6 is a fragmentary view, partly in section and partly in side elevation illustrating how the spit rods are unloaded from the conveyor cables;

Figure 7 is a view in side elevation, partly in transverse section, showing how the tongs and skewers are used in fastening the carcass of the fowl to one of the spit rods, the carcass being shown in broken lines;

Figure 8 is a fragmentary view in rear elevation of the apparatus.

Referring to the drawings by numerals, my improved barbecuing apparatus, as shown, comprises a generally rectangular base 1 of brick, or other suitable material, having a rectangular top recess 2 therein open at what constitutes the back of said base 1 with a closed bottom 3, and in which is slidably fitted, for withdrawal at the back of the recess 2, an open back, open top, fire box 4 for burning fuel such as charcoal, not shown, on a suitable grate 5 therein. The grate 5 is adapted to be supported in the fire box 4 on angle bars arranged in upper and lower pairs 6, 7 onto which said grate 5 may be slid selectively for varying the spacing thereof from the bottom of said fire box 4 to provide an ash pit 8 in said box below said grate 5. An upwardly opening door 9 hinged to the back of the base 1, as at 10, provides for closing the back of said recess 2 and the back of the fire box 4. A suitable slide damper 11 in said door 9 provides for variable updraft in said fire box 4. Below the bottom 3 of the recess 2, the base 1 is hollow to provide a warming oven 12, which may be entirely closed in any suitable manner if desired.

A stack 13 of rectangular shape in cross section arises from the top of the base 1 with sides 14 substantially flush with the sides of said base, and front and rear walls 15, 16 tapering upwardly, for better updraft through said stack. The front wall 15 of the stack 13 sets back from the front of the base 1 for a purpose presently seen. A covering 17 of suitable heat insulating material is provided on said stack 13. The stack 13 functions as a chimney and forms a vertically elongated pre-cooking chamber 18 for slow cooking therein, as presently described.

Pairs of side by side, endless, conveyor cables 19, 20 extend upwardly from the base 1 into the stack 13 for a substantial distance at opposite sides of said base 1 and stack 13 and from a pair of lower grooved wheels 21, 22 in said base 1 to a pair of relatively smaller upper idler wheels 23, 24 in said stack 13. The lower pair of wheels 21, 22 constitute drive wheels for the pairs of conveyor cables 19, 20 and run in side wells 25, 26 formed in the base 1 and at opposite sides of said recess 2, said wheels 21, 22 being suitably fixed on a horizontal shaft 27 extending through the base 1 from side to side thereof and through a clearance bore 28 in the bottom 3 of the recess 2, the ends of said shaft 27 being journaled in suitable bearings 29 set into the sides of the base 1. The pair of idler wheels 23, 24 are fixed on a horizontal shaft 30 extending through arcuate slots 31 in the sides 14 of the stack 13 with ends journaled in bearings 32 on a cable tightening yoke 33 straddling the stack 13 with ends pivoted, as at 34, on said stack 13 for upward swinging of said yoke to tighten said pairs of conveyor cables 19, 20. Coil springs 35 suitably interposed between said yoke 33 and brackets 36 on the stack 13 urge said yoke into cable tightening position. For reasons presently seen, the pairs of conveyor cables 19, 20 are operated upwardly at the rear of the stack 13 and downwardly at the front of said stack.

Means are provided for operating the pairs of conveyor cables 19, 20 with a step by step movement comprising the following. A hand wheel 37, with a lateral, circumferential flange 38 is suitably fixed on one end of the shaft 27 at one side of the base 1. An upstanding holding dog 39 is pivoted, as at 40, on a floor bracket 41 to enter equidistantly spaced notches 42 in said flange 38, and is tensioned by a spring 43 to snap into said notches. The spring 43 is suitably connected to said dog 39 at the base 1. A pair of oppositely extending pedal bars 44, 45 are pivoted intermediate the ends thereof, as at 46, 47, on one side of the base 1 with juxtaposed ends underlying a lateral shoulder 48 on the holding dog 39, so that depression of the other ends of said pedal bars 44, 45 will result in swinging of said holding dog 39 out of the notches 42. As shown in Figure 1, the pedal bars 44, 45 are arranged to be operated by foot, one at the front and the other at the rear of the base 1, a particular advantage of which will presently appear.

Spit rod holders 49 of C-shape are spaced at equidistant points along the pairs of conveyor cables 19, 20 in opposed pairs with back clips 50 thereon fastening said cables together in pairs.

Round spit rods 51 are rotatably supported adjacent the ends thereof in said pairs of holders 49 and are removable at the front of the stack 13 from said pairs of holders and adapted to be loaded into said pairs of holders at the rear of said stack. Cross skewers 52 on the spit rods 51 provide for impaling the split carcasses of fowls straddling said spit rods 51, as shown at 53 in dotted lines in Figure 7 whereby said carcasses may be fastened onto said rods. Resilient tongs 54 are provided for straddling the carcasses 53 cross-wise and holding the sides thereof together.

In the rear wall 16 of the stack 13 is a suitable door 55 through which spit rods 51 with carcasses 53 of fowl fastened thereon, as described, may be loaded into opposed pairs of holders 49 through the back of the stack 13, as said pairs of holders 49 are caused to travel into a position opposite said door.

The spit rods 51 are designed to be unloaded at the front and bottom of the stack 13 to form, successively, part of a rotisserie, now to be described.

An open front hood 56, with sides 57 rising from opposite sides of the base 1, and an upwardly and rearwardly slanting top 58 is provided at the front and bottom of the stack 13 and suitably secured in place with the sides 57 co-planar with the sides 14 of said stack. The hood 56 extends over the front part of the fire box 4 and opens at its back into the stack 13. A bearing block 58 with a top notch 59 therein is suitably fixed on the base 1 under the hood 56 at one side of said hood. An open top box 60, for a spit rod drive, presently described, is suitably fixed on said base 1, under said hood 56 at the opposite side of said hood. A pair of horizontal, knurled, cross pins 61 are rotatably mounted in said box 60, one of which is adapted to be driven by a worm wheel 62 fastened thereon and meshing with a worm 63 fastened on a drive shaft 64 suitably journaled in said box 60 and extending rearwardly therefrom into the bottom of the stack 13. A suitable motor 65 on the base 1 is operatively connected to said drive shaft 64. The motor 65 may be connected to any suitable source of power and controlled by any suitable means, not shown, since the same form, per se, no part of this invention.

The spit rods 51 are adapted to be unloaded to roll at one end into the notch 59, to be rotated therein, and are each provided with a knurled wheel 66 thereon adjacent the other end designed to roll into the box 60 onto the pins 61 to be rotated by the driven one of said pins.

For unloading the spit rods 51, a pair of unloading track rails 67, 68 incline downwardly and forwardly out of the stack 13 through the back of the hood 56 to the top of the bearing block 58 and the top of the box 60, with upper ends extending past the front runs of the pairs of conveyor cables 19, 20 at the outer sides of said pairs, so that the ends of the spit rods 51 will be fed by a downward travel of said front runs onto said rails 67, 68. In this connection, it is to be noted that the upper ends of said rails 67, 68 are arranged relative to the pairs of holders 49 to cause the ends of the spit rods 51 to be cammed forwardly out of the pairs of holders 49 whereby said spit rods 51 are unloaded to roll down said rails. The lower end of one rail 67 is arranged to direct one end of the unloaded spit rods 51 into the bearing notch 59, and the lower end of the rail 68 is arranged to direct the corresponding end of the spit rods 51 so that the wheels 66 of said spit rods will enter the top of the box and seat on the pair of pins 61.

At one side of the stack 13, an upwardly inclined flue 69 opens into the same at a suitable point for introducing smoke, for instance from a hickory wood fire, not shown, into said stack 13 between the upper ends of the pairs of conveyor cables 19, 20 and the point of unloading of the spit rods 51.

Electric heaters 70, 71 may be installed in the stack 13 in the front and rear of the front run of the pairs of conveyor cables 19, 20 and substantially opposite the position at which the spit rods 51 are unloaded. The electric heaters 70, 71 act as booster heaters in the stack 13 upon opposite sides of carcasses fastened on a spit rod 51 about to be unloaded.

The manner in which the described apparatus is designed to be operated will be readily understood.

The hand wheel 37 is rotated intermittently in the proper direction to operate the pairs of conveyor cables 19, 20 in the direction described, step by step. The holding dog 39 is released by means of one or the other of the pedal bars 44, 45 at the beginning of each phase of operation of said wheel 37 and permitted to snap into one of the notches 42 at the end of the phase of operation of said wheel. At each phase of operation of the pairs of conveyor cables 19, 20 a pair of the spit rod holders 49 is elevated at the rear of the apparatus into a position before the door 55 so that a spit rod 51, loaded with carcasses 53 thereon, may be loaded into said pair of holders. Successive pairs of spit rod holders 49 may thus be loaded with loaded spit rods 51 until the leading spit rod 51 comes into unloading position over the track rails 67, 68. Now, with fuel burning in the fire box 4, the carcasses 53 loaded into the apparatus may be subjected to slow precooking by the heat escaping up the stack 13. Also, such carcasses 53 may be smoked, through the medium of the flue 69 in a manner already described, to impart additional flavor thereto while the slow cooking is progressing. When a cooked fowl is desired, the hand wheel 37 may be operated, one phase, whereupn the leading spit rod 51 will be unloaded from its holders 49, which is to say the pairs of conveyor cables 19, 20, onto the track rails 67, 68, in the manner previously described, to roll down said rails and form part of the described rotisserie in which, the motor 65 being in operation, the carcasses 53 on the unloaded spit rod will be barbecued over a hot fire, on display, and to suit the ordering customer. As will be understood, the unloaded spit rod 51 loaded with carcasses 53, or a carcass, is slowly revolved over the open fire by the means already described. By lifting the spit rod 51 on which the barbecued carcass has been cooked out of the notch 59, and the wheel 66 of said rod out of the box 60, said rod may be removed forwardly out of the hood 56 and the barbecued carcass 53, or carcasses, removed in a manner which will be clear and for service at will. The next spit rod 51 may then be brought into position for unloading, and another loaded spit rod 51 loaded into the apparatus into the rear thereof, and these operations repeated as occasion may require. At any time, when cooking is not desired, and with the apparatus loaded, or partly loaded, the fire may be drawn by withdrawing the fire box 4 from the recess 2. Of course, the hand wheel may be operated to feed, or operate, the pairs of conveyor cables 19, 20 otherwise then step by step if such operation is desired, and by spinning said wheel with the holding dog 39 disengaged.

The foregoing will, it is believed, suffice to impart a clear understanding of my invention, without further explanation.

Manifestly, the invention, as described, is susceptible of modification, without departing from the inventive concept, and right is herein reserved to such modifications as fall within the scope of the appended claims.

Having described the invention, what is claimed as new is:

1. In apparatus of the class described, a base, an open top fire box in the top of said base for an open fire, a stack arising from said base over said fire box and forming a vertically elongated slow cooking chamber therein, a rotisserie cooker at the base of said stack for broiling the whole carcasses of fowl directly over said fire on rotary spit rods, a plurality of spit rods adapted to be loaded with carcasses to be broiled, means for conveying the loaded spit rods upwardly into said chamber and downwardly to said rotisserie cooker for slow cooking in said chamber prior to cooking of the carcasses in said rotisserie cooker, means for unloading said downwardly conveyed spit rods successively at will into said rotisserie cooker one at a time, and means for rotating each spit rod in said rotisserie cooker.

2. In apparatus of the class described, a base, an open top fire box in the top of said base for an open fire, a stack arising from said base over said fire box and forming a vertically elongated slow cooking chamber therein, a rotisserie cooker at the base of said stack for broiling the whole carcasses of fowl directly over said fire on rotary spit rods, a plurality of spit rods adapted to be loaded with carcasses to be broiled, means for conveying the loaded spit rods upwardly into said chamber and downwardly to said rotisserie cooker for slow cooking in said chamber prior to cooking of the carcasses in said rotisserie cooker, means for unloading said downwardly conveyed spit rods successively at will into said rotisserie cooker one at a time, means for rotating each spit rod in said rotisserie cooker, the first mentioned means comprising vertically extending endless conveyor cables in said stack at opposite sides thereof having spit rod holders thereon arranged in opposed horizontally aligned pairs for loading of opposite ends of the spit rods in said pairs, and means for rotating said cables step by step in unison.

3. In apparatus of the class described, a base, an open top fire box in the top of said base for an open fire, a stack arising from said base over said fire box and forming a vertically elongated slow cooking chamber therein, a rotisserie cooker at the base of said stack for broiling the whole carcasses of fowl directly over said fire on rotary spit rods, a plurality of spit rods adapted to be loaded with carcasses to be broiled, means for conveying the loaded spit rods upwardly into said chamber and downwardly to said rotisserie cooker for slow cooking in said chamber prior to cooking of the carcasses in said rotisserie cooker, means for unloading said downwardly conveyed spit rods successively at will into said rotisserie cooker one at a time, means for rotating each spit rod in said rotisserie cooker, and means for introducing a flavoring smoke into said stack from an outside source for flavoring the carcasses during slow cooking.

4. In apparatus of the class described, a base, an open top fire box in the top of said base for an open fire, a stack arising from said base over said fire box and forming a vertically elongated slow cooking chamber therein, a rotisserie cooker at the base of said stack for broiling the whole carcasses of fowl directly over said fire on rotary spit rods, a plurality of spit rods adapted to be loaded with carcasses to be broiled, means for conveying the loaded spit rods upwardly into said chamber and downwardly to said rotisserie cooker for slow cooking in said chamber prior to cooking of the carcasses in said rotisserie cooker, means for unloading said downwardly conveyed spit rods successively at will into said rotisserie cooker one at a time, means for rotating each spit rod in said rotisserie cooker, said unloading means being constructed and arranged for gravity feed of said spit rods from said conveying means forwardly therefrom into said rotisserie cooker.

5. In apparatus of the class described, a base, an open top fire box in the top of said base for an open fire, a stack arising from said base over said fire box and forming a vertically elongated slow cooking chamber therein, a rotisserie cooker at the base of said stack for broiling the whole carcasses of fowl directly over said fire on rotary spit rods, a plurality of spit rods adapted to be loaded with carcasses to be broiled, means for conveying the loaded spit rods upwardly into said chamber and downwardly to said rotisserie cooker for slow cooking in said chamber prior to cooking of the carcasses in said rotisserie cooker, means for unloading said downwardly conveyed spit rods successively at will into said rotisserie cooker one at a time, and means for rotating each spit rod in said rotisserie cooker comprising a motor driven worm drive for rotating said spit rod slowly.

6. In apparatus of the class described, an open top fire box, a stack arising from said fire box and forming a vertically elongated slow cooking chamber therein, said fire box extending forwardly of said stack to form an open cooker at the bottom of said stack for broiling the carcasses of fowl directly over said fire on spit rods, a plurality of spit rods adapted to be loaded with carcasses of fowl to be broiled, and means for conveying the spit rods upwardly in said chamber and then downwardly to said cooker for slow cooking of said carcasses preparatory to cooking over said cooker comprising a pair of laterally spaced conveyor cables with open clips thereon for supporting said spit rods for lifting out of the same, means for rotatably supporting said spit rods over said slow cooker comprising a pair of rotary laterally spaced pins for seating one end of said rods thereon, means for lifting said spit rods from said clips for rolling under the influence of gravity onto said supporting means comprising a pair of track members inclining out of the path of downward movement of said spit rods downwardly to said supporting means to intercept said spit rods during downward movement thereof and lift the same out of said clips for rolling down said members onto the supporting means, and means for rotating one of said pins to cause rotation of the spit rods on said supporting means.

7. In apparatus of the class described, an open top fire box for cooking with an open fire and having a front side, a rotisserie cooker above said fire box at said front side thereof for broiling the carcasses of fowl directly over said open fire on rotating spit rods, a plurality of spit rods adapted to be loaded with the carcasses to be broiled, means for suspending said spit rods over said fire box in the rear of said cooker and conveying the same upwardly and downwardly for slow cooking of the carcasses prior to broiling of the same over said cooker, means for unloading the downwardly conveyed spit rods successively into said rotisserie cooker, and means for rotating each spit rod in said cooker.

8. In apparatus of the class described, an open top fire box for cooking with an open fire and having a front side, a rotisserie cooker above said fire box at said front side thereof for broiling the carcasses of fowl directly over said open fire on rotating spit rods, a plurality of spit rods adapted to be loaded with carcasses to be broiled, means for suspending said spit rods over said fire box in the rear of said cooker and conveying the same upwardly and downwardly for slow cooking of the carcasses prior to broiling of the same over said cooker, means for unloading the downwardly conveyed spit rods successively into said rotisserie cooker, means for rotating each spit rod in said cooker, and means for subjecting the carcasses on the upwardly and downwardly conveyed spit rods to the action of a flavoring smoke.

9. In apparatus of the class described, an open top fire box for cooking with an open fire and having a front side, a stack over said fire box forming an elongated slow cooking chamber, a plurality of spit rods for holding meat to be cooked, means for conveying said spit rods step by step upwardly into said chamber over said fire and then downwardly toward said fire for slow cooking of the meat in said chamber, means for introducing a flavoring smoke into said chamber to flavor the meat, and means for unloading the downwardly conveyed spit rods and discharging the same out of said chamber at the base of said stack and above said front side of said fire box successively as the same are fed downwardly.

10. In apparatus of the class described, on open top fire box for cooking fowl, a plurality of spit rods adapted to be loaded with the carcasses of fowls to be cooked, means for conveying the spit rods downwardly toward said fire box comprising a pair of laterally spaced conveyor cables with open clips thereon for supporting said spit rods for lifting out of the same, means for rotatably supporting said spit rods over said fire box for cooking thereover comprising a pair of rotary laterally spaced pins for seating one end of said spit rods, means for lifting said spit rods out of said clips for rolling under the influence of gravity onto said supporting means comprising a pair of track members inclining out of the path of downward movement of said spit rods downwardly to said supporting means to intercept the spit rods during downward movement thereof and lift the same out of said clips for rolling down said members onto said supporting means, and means for rotating one of said pins to cause rotation of the spit rods on said supporting means.

LAWRENCE G. SAGEN.

REFERENCES CITED

The following references are of record in the file of this patent:

UNITED STATES PATENTS

| Number | Name | Date |
|---|---|---|
| 694,889 | Pooley | Mar. 4, 1902 |
| 1,776,501 | Grady | Sept. 23, 1930 |
| 2,142,390 | Zerr | Jan. 3, 1939 |